United States Patent [19]
Liljeros

[11] 4,051,746
[45] Oct. 4, 1977

[54] MECHANISM FOR OPENING AND CLOSING A MOVABLE MEMBER

[76] Inventor: Rolf Sven Gunnar Liljeros, 17 Waltham Avenue, Glazebury, Warrington, England

[21] Appl. No.: 659,639

[22] Filed: Feb. 20, 1976

[51] Int. Cl.² .................... G05G 1/04; B60P 1/26; E05F 15/04
[52] U.S. Cl. ........................ 74/520; 49/340; 49/344; 49/345; 298/23 MD
[58] Field of Search .................. 49/340, 344, 345; 74/520; 248/240.2, 240.4; 298/23 MD

[56] References Cited

U.S. PATENT DOCUMENTS

| 119,060 | 9/1871 | Swain | 248/240.4 |
|---|---|---|---|
| 1,042,381 | 10/1912 | Baker | 74/520 X |
| 1,542,341 | 6/1925 | Deckert | 74/520 X |
| 2,245,252 | 6/1941 | Cleghorn | 74/520 X |
| 3,773,385 | 11/1973 | Sandberg | 49/340 X |

FOREIGN PATENT DOCUMENTS 447,497   7/1927   Germany .................. 49/345

Primary Examiner—Allan D. Herrmann
Attorney, Agent, or Firm—Blanchard, Flynn, Thiel, Boutell & Tanis

[57] ABSTRACT

An apparatus for controlling the movement of a movable tail-gate hinged to a tipping body of a vehicle. A collapsible toggle linkage is pivotally connected at one end to a flap adapted to bear against the tail-gate and the opposite end of the linkage is pivotally connected to a support secured to the vehicle. The toggle linkage is moved between erect and collapsed conditions by a piston and cylinder assembly, the piston rod of said assembly being connected to the interconnected ends of the toggle linkage by a bracket. The bracket serves as a stop to prevent outwardly collapsing movement of the toggle linkage. The tail-gate can be maintained in a closed position independently of any forces exerted by the piston and cylinder assembly.

11 Claims, 5 Drawing Figures

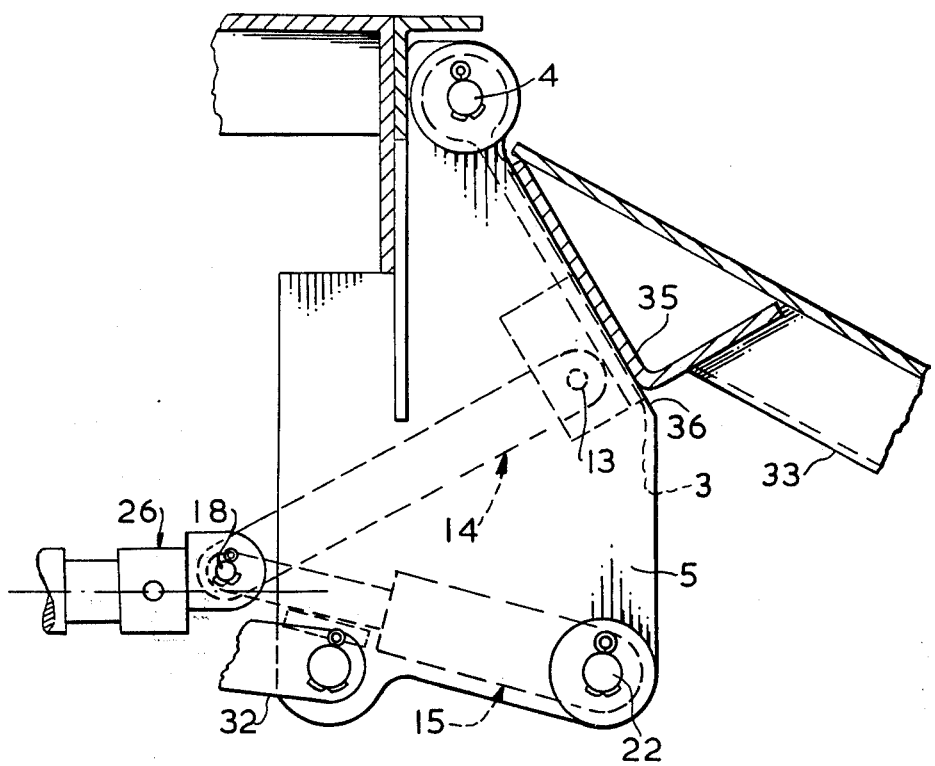
-FIG. 3-

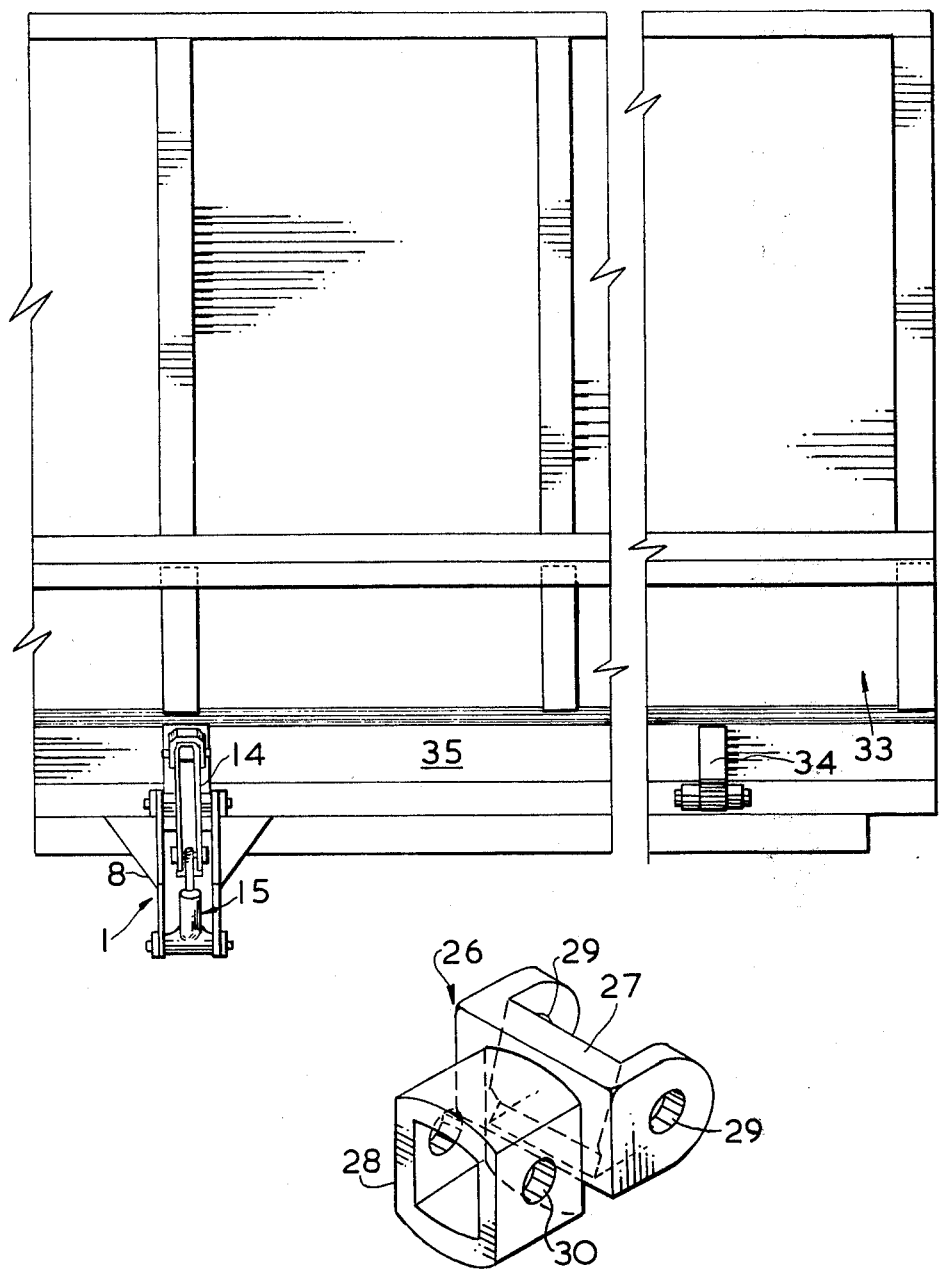

MECHANISM FOR OPENING AND CLOSING A MOVABLE MEMBER

The present invention concerns an apparatus for controlling the movement of a first member hinged to a second member. In particular the invention concerns an apparatus for opening and closing a movable tail-gate hinged to a tipping body of a vehicle.

It is usual to provide vehicles which are employed to transport bulk loads with a tail-gate which is hinged to the vehicle body in order that the load can slide out of the body upon tipping. Generally, a driver of such a vehicle has to release the tail-gate manually by removing locking pins or the like before the body can be tipped to empty the load. This involves the driver vacating his cab thereby leaving the vehicle effectively unattended in addition to exposing the driver to risk of injury in releasing tail-gates which might be jammed or otherwise damaged.

According to the present invention an apparatus for controlling the movement of a first member hinged to a second member comprises actuating means operable to swing the first member between first and second positions and operably connected to the first member through a collapsible linkage, one end of the linkage being pivotally connected to the first member and the opposite end of the linkage being pivotally connected to the second member and means for maintaining the linkage in an erect condition operable independently of the actuating means.

The invention will be described further, by way of example, with reference to the accompanying drawings, in which:

FIG. 3 is a view corresponding to FIG. 2 but with the tail-gate in an open position;

FIG. 4 illustrates a detail of the apparatus;

FIG. 5 is a rear view of a tail-gate fitted with the apparatus.

Figure 1:
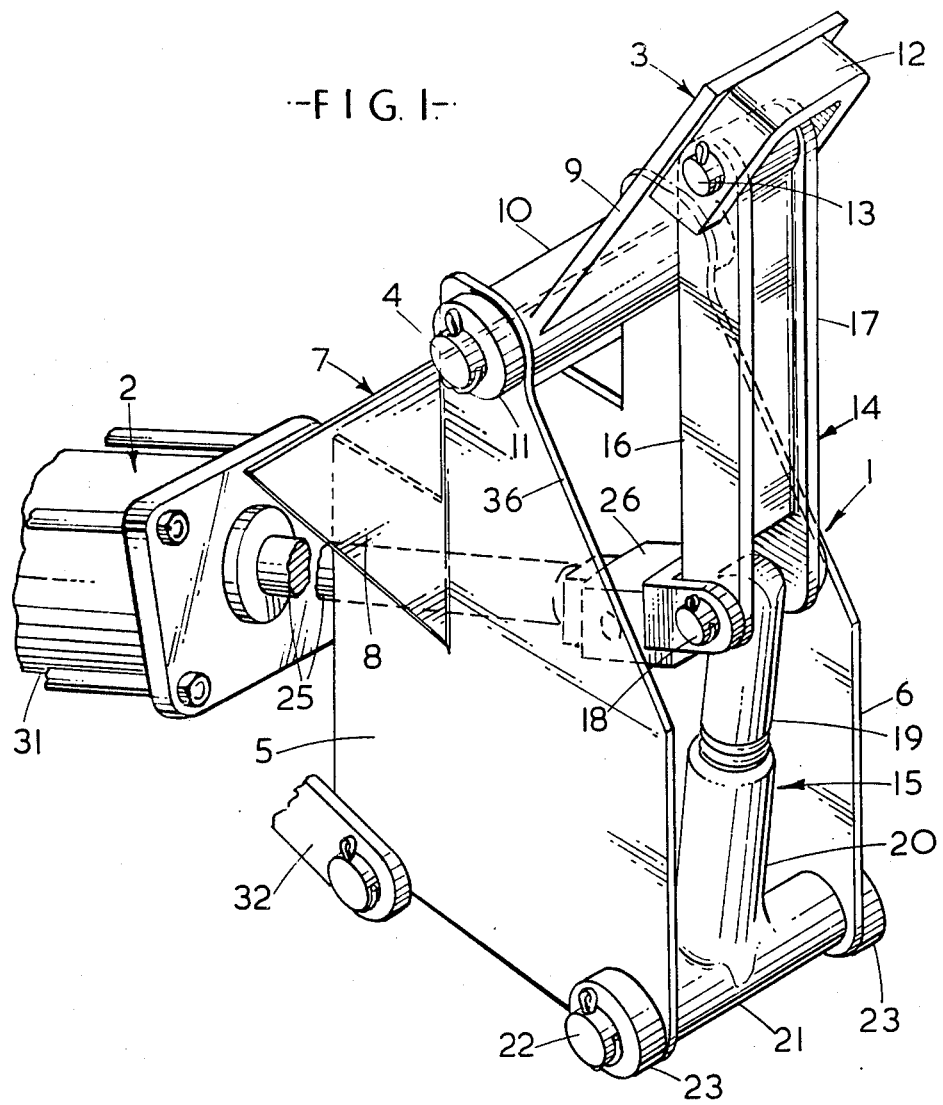
FIG. 1 is a general view of an embodiment of the apparatus according to the invention.

With reference to FIG. 1, the apparatus comprises a collapsible toggle linkage 1 which can be actuated by a piston and cylinder assembly 2 to pivot a flap 3 about a spindle 4.

The toggle linkage 1 and the flap 3 are supported by a pair of spaced-apart, substantially parallel, side plates 5 and 6. The plates 5 and 6 are connected together by a transverse member 7 which can be welded to the side plates and, in the illustrated embodiment, has a triangular portion 8 extending outwardly normal to the outer face of each side plate. The triangular portions provide means for anchoring the apparatus to a vehicle body. Between the side plates the transverse member is reduced to avoid interference with an actuating mechanism. A further metal plate (not shown) can be welded between the side plates at the bottom adjacent the end remote from the toggle linkage 1.

The flap 3 is pivotally connected to the upper ends of the plates 5 and 6. The flap 3 comprises a plate portion 9 terminating in an integral sleeve 10 to receive the spindle 4 which passes through two bosses 11 formed one at each upper end of the plates 5 and 6. Upon passing through the boss in the plate 5, the sleeve 10 and the boss in the opposing plate 6 the spindle is secured, for example, by split pins through the ends thereof protruding beyond the plates 5 and 6. A channel-shaped bracket 12 is secured to the base of the flap 3 at its end remote from the sleeve 10. The bracket 12 can be welded to the base of the flap 3. The opposing limbs of the channel-shaped bracket 12 are provided with coaxial bores to receive a spindle 13.

The toggle-linkage 1 comprises an upper arm 14 and a lower arm 15. The upper arm can comprise a pair of spaced-apart elongate plates or rigid strips, but preferably, the arm 14 is substantially I-shaped in cross-section having two elongate limbs 16 and 17 interconnected by a central web. At its upper end as seen in FIG. 1 the web is enlarged to form a boss or sleeve to receive the spindle 13. The spindle 13 can be secured by split-pins which pass through the ends of the spindle which protrude beyond the limbs of the channel-shaped bracket 12. At its opposite end, that is the lower end as seen in FIG. 1, the central web terminates short of the ends of the limbs 16 and 17. The ends of the limbs are formed with coaxial bores to receive a further spindle, 18.

The lower arm 15 of the toggle-linkage 1 is pivotally connected to the upper arm 14. The lower arm 15 is adjustable in length and comprises a screw-threaded shank portion 19 which engages in a bore having a complementary screw thread and formed in the stem of a substantially T-shaped portion 20. The end of the shank portion 19 is positioned between the ends of the limbs 16 and 17 of the upper arm and is provided with a through bore to receive the spindle 18.

The stem of the T-shaped portion terminates in a hollow cross-member 21 to receive a spindle 22 the ends of which protrude through coaxial bosses 23 formed in the side plates 5 and 6. As before the spindle 22 can be secured by split-pins.

A piston rod 25 of the piston and cylinder assembly 2 is coupled to the toggle-linkage by means of a bracket 26. With reference to FIG. 4 the bracket 26 comprises a channel-shaped portion 27 which is formed integral with a hollow box-shaped portion 28. Conveniently, the bracket 26 is formed by casting. The opposing limbs of the channel-shaped portion 27 are formed with coaxial bores 29 to receive the spindle 18. The opposing side walls of the box-shaped portion 28 are likewise formed with coaxial bores 30 to receive a further spindle which secures the end of the piston rod 25 to the bracket 26. The components are dimensioned so as to reduce to a minimum any sideways play or slope at the coupling.

The apparatus as described above is secured at the bottom and rear of the vehicle body. Cylinder 31 of the piston and cylinder assembly 2 is secured for pivoting about its end remote from the toggle-linkage and two struts 32 one on each side of the cylinder, interconnect the pivot pin to the side plates 5 and 6. These struts 32 serve to strengthen and brace the apparatus. Ports are provided at opposite ends of the double-acting cylinder 31 for the admission and exhaust of actuating fluid during operation. The fluid can be hydraulic or pneumatic and conveniently the source is compressed air which is available for operating the brakes of the vehicle.

Tail-gate 33 is hinged at its base to the rear end of the vehicle body by means of hinge brackets 34 shown in FIG. 5. The tail-gate is provided with a pressure beam 35 which is triangular in cross-section and the flap 3 bears against this pressure beam 35. The flap is not secured to the pressure beam. The tail-gate extends across the full width of the vehicle but its height can be selectively chosen. Preferably the height of the tail-gate is chosen to be but a portion of the total height of the vehicle body. The end of the compartment in such a case can be closed by a hinge gate connected to the top of the side walls of the body and with its lower end positioned to lie behind the tail-gate but above the floor of the body. The end wall of the body is in this case a two-part wall comprising the hinge gate pivoted at its upper end to the side walls of the body and the tail-gate hinged at its base to the floor or a transverse support at the bottom of the compartment. The top of the tail-gate overlaps the bottom of the hinge gate so as to secure the hinge gate in a closed position.

Figure 2:
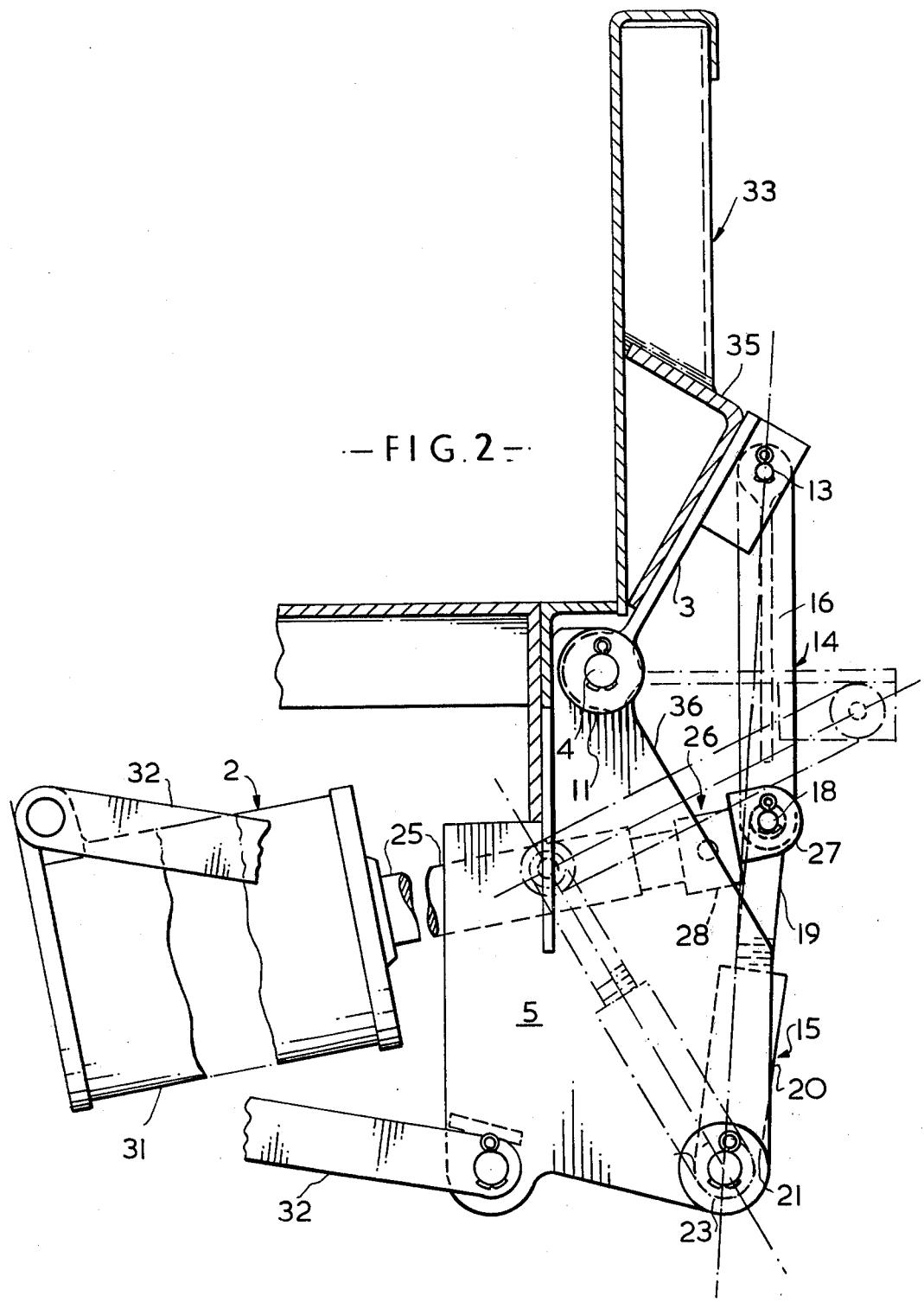
FIG. 2 is a side view of the apparatus when fitted to a vehicle body and with a tail-gate in a closed position.

FIG. 2 shows the tail-gate 33 in a fully closed position and FIG. 3 shows the gate in a fully open position. In the fully closed position the axis of the pivot spindle 18 lies on the side of a line drawn through the axis of the pivot spindles 13 and 22 which is remote from the vehicle body. The displacement of the pivot 18 from the line joining the axes of the other pivots 13 and 22 can be small, for example it can be of the order of 1 cm., but it is required in order that the apparatus is self-locking in the closed position and the flap cannot move from its closed to its open position without a positive displacement of the piston rod in a direction towards the front end of the vehicle, that is towards the left as viewed in FIGS. 2 and 3. When in the closed position the weight on the flap is such as to urge the toggle-linkage to collapse outwards, that is away from the vehicle body. Due to the arrangement of the pivots the linkage is prevented from collapsing inwardly towards the vehicle body under the weight of a load on the flap. The linkage is prevented from collapsing outwardly by means of the bracket 26 which constitutes a stop.

The base of the channel-shaped portion 27 and the adjoining surface of the box-shaped portion 28 bear against the surface of the upper and lower arms 14 and 15 about the pivot 18 and prevent the arm from collapsing outwardly. The tail-gate can therefore be maintained in a closed position independently of any forces exerted by the piston and cylinder assembly.

To open the gate the piston and cylinder assembly is actuated to pull the piston rod 25 and hence the bracket 26 inwardly towards the vehicle body. The collapse can be arrested when the lower arm 15 of the toggle-linkage contacts the cross member across the bottom of the side plates 5 and 6. When in the open position the longitudinal axis of the piston rod 25 lies between the pivot spindles 13 and 22. This is to ensure that the piston rod 25 can, upon a reverse stroke, move the toggle-linkage from its collapsed condition shown in FIG. 3 back into its erect condition shown in FIG. 2.

When collapsed the upper surface of the flap 3 is preferably arranged slightly below inclined edges 36 of the side plates 5 and 6. In this way the inclined edges 36 serve to support the tail-gate when in its open position and also prevent the tail-gate from swinging against lights, number plates and indicators at the rear of the vehicle. Adjustment can be effected by means of the adjustable arm 15 of the toggle-linkage. The tail-gate can be arranged so that in its open position it forms an extension of the base of the vehicle body and it functions as a chute to direct the load clear of the vehicle.

The apparatus is capable of locking the tail-gate in its closed position against a full load in the vehicle body even when the body is tipped to its maximum elevated position.

A control mechanism for actuating the piston and cylinder assembly can be located within the driving cab of the vehicle so as to enable a driver to unload the vehicle without leaving the cab. The driver is merely required to operate the mechanism to tip the body and the control mechanism to actuate the piston and cylinder mechanism. A cut-out valve can be included in the pneumatic circuit to render the piston and cylinder mechanism inoperative if the pressure required to operate the piston exceeds a predetermined value. The tail-gate, which is hinged to the bottom of the vehicle body, co-operates with a top-hinged gate to close the rear of the vehicle body. In effect a bottom portion of a conventional top-hinged gate is replaced by the tail-gate hinged to the bottom of the vehicle body. Conventional top-hinged gates usually dig into the load being tipped from the body and this disadvantage can be avoided by employing a shorter top-hinged gate in conjunction with the tail-gate.

Although the above is described with reference to a tail-gate of a tipper vehicle it will be realised that the apparatus is suitable for use with other hinged members which require to be locked in a closed position.

It is possible to modify the illustrated embodiment. Thus the arms 14 and 15 can be interchanged so that the upper arm of the toggle-linkage is adjustable in length. Further an adjustment means can be incorporated in the pressure beam 35.

I claim:

1. An apparatus for controlling the movement of a tail-gate of a vehicle body, comprising:
    a support securable to the vehicle body adjacent and below the tail-gate;
    a flap adapted to bear against the tail-gate;
    a collapsible linkage having first and second arms pivotally interconnected on a pivot axis at their one ends to form a toggle, the opposite ends of the arms pivotally connected to the flap and to the support respectively;
    actuating means operable to swing the flap between first and second positions for both opening and closing the tail-gate respectively; and
    a bracket operatively connecting the actuating means to the linkage, the bracket including means responsive to said pivot axis being immediately on the side of a line joining the opposite ends of the arms remote from the actuating means for preventing collapse of said toggle.

2. An apparatus as claimed in claim 1 in which the support comprises two spaced apart rigid plates and the flap, linkage and actuating means arranged between the plates, the plates including means for supporting the tail-gate when the linkage is in a collapsed condition.

3. An apparatus as claimed in claim 1 in which one of the first and second arms is adjusted axially in length.

4. An apparatus as claimed in claim 1 in which the bracket comprises a channel-shaped portion embracing the interconnected ends of the linkage and a hollow box-shaped portion to receive and form an operable connection with the actuating means.

5. An apparatus as claimed in claim 4 in which the actuating means comprises a pneumatically operated piston and cylinder assembly, the cylinder being pivotally connected to the vehicle body and the piston having a piston rod the end of which is received in the box-shaped portion of the bracket.

6. An apparatus as claimed in claim 5 in which the piston and cylinder assembly is controlled from a remote location.

7. An apparatus as claimed in claim 5 including stiffening bars extending between the pivot connection of the cylinder and the support.

8. An apparatus for controlling the movement of a tail-gate of a vehicle body, comprising;
- a support securable to the vehicle body adjacent and below the tail-gate, said support having two laterally spaced rigid plates aligned in planes transverse to the tail-gate, said plates having substantially rearward facing edge means for engaging and supporting the opened tail-gate;
- a flap pivoted between said support plates and extending therefrom to supportively bear against the tail-gate;
- a collapsible linkage having first and second arms with adjacent ends pivotally interconected on a pivot axis to form a toggle, the remote end of said first arm being pivotally connected to said flap, the remote end of said second arm being pivoted between said support plates, the support plate pivots of said flap and second arm defining a plane transverse to said plates, said arms having a collapsed tail-gate open position with the pivotally interconnected adjacent ends thereof spaced in one direction from said plane and having a straightened tail-gate closed position spaced in the opposite direction from said plane; and
- an actuating means engaging said toggle linkage between said plates and reversibly actuable for pivoting said arms from said straightened tail-gate closed position to said collapsed tail-gate open position and vice versa.

9. An apparatus as claimed in claim 1 in which said support includes a cross member extending and connecting the lower edges of said plates, said cross member lying in the path of pivotal motion of said second arm to limit collapsing motion of said toggle linkage beyond the tail-gate open position and therewith preclude excessive movement of said flap away from said tail-gate with the latter open.

10. An apparatus as claimed in claim 8 in which said actuating means comprises a reciprocable member terminating in a bracket, said bracket including a first portion through which said pivot axis extends for copivoting said bracket and said first and said second arms on said pivot axis, said bracket further including a second portion fixed transversely to said first portion and having surface means simultaneously engageable with points on said first and second arms remote from said pivot axis and facing toward said actuating means for positively blocking pivoting of said arms beyond said tail-gate closed position in a direction opposite their tail-gate open position.

11. An apparatus as claimed in claim 10 including a triangular cross section pressure beam fixed to the tail-gate of the truck and extending widthwise thereof near the hinge axis of the tail-gate, and wherein said support includes a transverse mounting member adjacent the upper end thereof for securing said upstanding plates to said truck adjacent said beam and with the hinge axis of said truck and the pivot axis of said flap cooperatively arranged for flush seating of said beam on said flap and on said edge means of said plates.

* * * * *

UNITED STATES PATENT AND TRADEMARK OFFICE
CERTIFICATE OF CORRECTION

PATENT NO. : 4 051 746
DATED : October 4, 1977
INVENTOR(S) : Rolf Sven Gunnar Liljeros It is certified that error appears in the above-identified patent and that said Letters Patent are hereby corrected as shown below:

Column 4, line 54; change "adjusted" to ---adjustable---.

Column 6, line 1; change "Claim 1" to ---Claim 8---.

Column 6, line 2; after "extending" insert ---between---.

Signed and Sealed this

Seventh Day of March 1978

[SEAL]

Attest:

RUTH C. MASON
Attesting Officer

LUTRELLE F. PARKER
Acting Commissioner of Patents and Trademarks